Aug. 24, 1948.    H. F. CLARK    2,447,488
SINGLE PHASE MOTOR CONTROL
Filed March 28, 1946    4 Sheets-Sheet 1
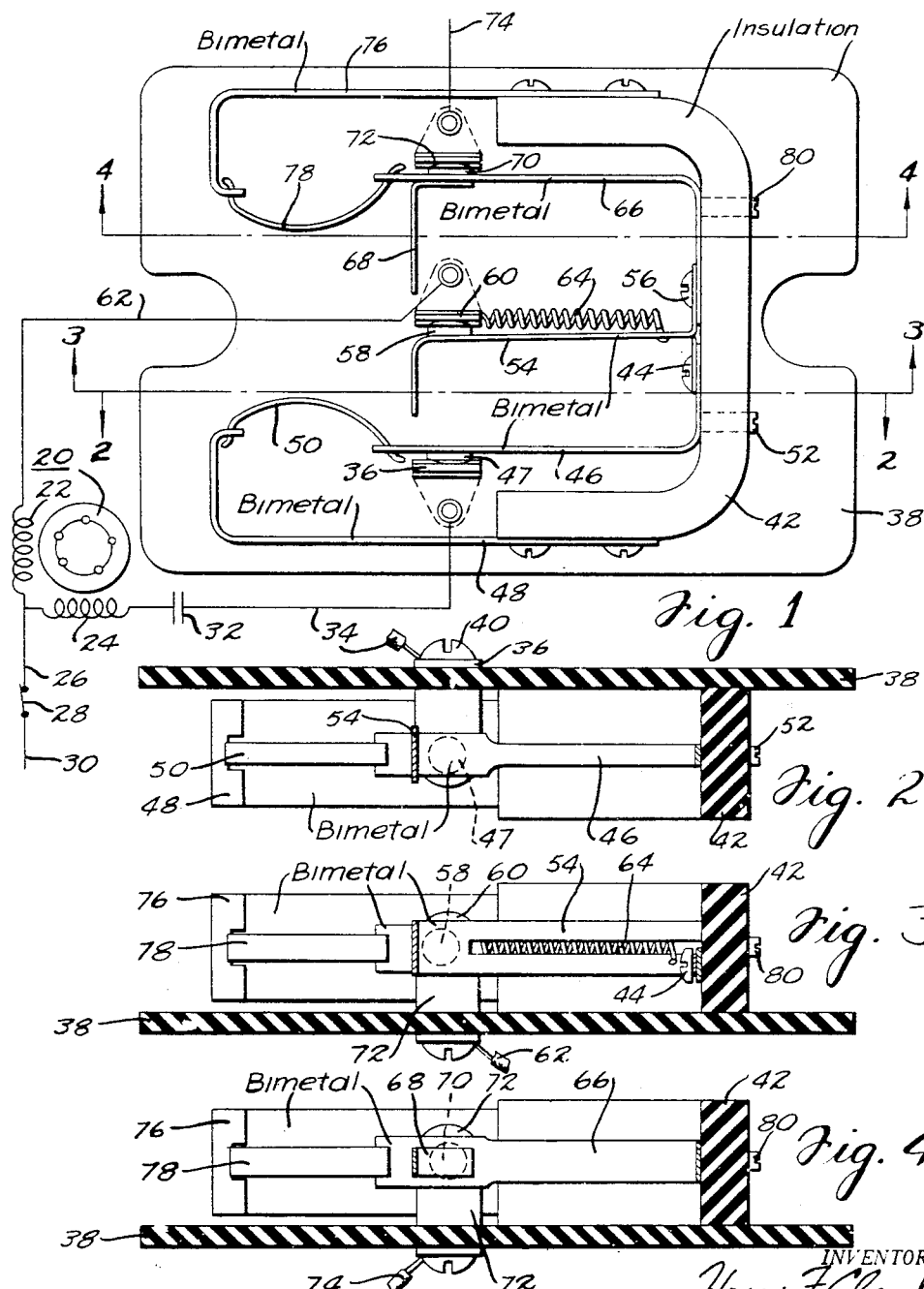

Aug. 24, 1948.    H. F. CLARK    2,447,488
SINGLE PHASE MOTOR CONTROL
Filed March 28, 1946    4 Sheets-Sheet 3

INVENTOR.
Harry F Clark
BY
Spencer Hardman and Lehr
Attorneys

Aug. 24, 1948. H. F. CLARK 2,447,488
SINGLE PHASE MOTOR CONTROL

Filed March 28, 1946 4 Sheets-Sheet 4

INVENTOR
Harry F Clark
BY
Spencer Hardman and Shr
Attorneys

Patented Aug. 24, 1948

2,447,488

UNITED STATES PATENT OFFICE 2,447,488

SINGLE-PHASE MOTOR CONTROL

Harry F. Clark, Oakwood, Ohio, assignor to General Motors Corporation, Dayton, Ohio, a corporation of Delaware Application March 28, 1946, Serial No. 657,792

19 Claims. (Cl. 318—221)

This invention relates to electrical apparatus and more particularly to motor starting and overload controls for electric motors.

Because of their apparent simplicity, there have been many attempts to provide satisfactory bimetal starting and overload controls for electric motors. One example of such a bimetal starting control is shown in Fig. 2 of the Werner Patent No. 2,117,123. A number of difficulties have prevented the wide use of such a control.

One of the most troublesome factors is the wide range of current values which must be conducted by the starting control. In such bimetal starting controls, the motor current is used to first rapidly heat the bimetal operated starting switch until the starting circuit is opened. The motor current must then continue to heat the bimetal operated starting switch to keep the starting circuit open throughout the remainder of the running period of the motor. It is wellknown that at the point of use or connection of a device connected to a commercial supply line, the voltage varies widely depending upon the condition of the system. For example, a nominal 110 volt circuit may deliver current at a voltage of from 90 to 120 or 125 volts.

By testing such bimetal starting controls, it has been found if sufficient heat is provided for the starting control to give proper starting on a 90 volt current supply, that too rapid heating will occur upon a 120 volt supply. Or, if the heating is reduced sufficiently to prevent too rapid heating on 120 volts, the heating will be insufficient to cause the bimetal to hold the starting circuit open when the voltage supply drops to 90 volts. Even where the power supply and individual power circuit does not vary to this extent, a manufacturer of starting controls is still confronted with this problem, since the equipment he builds for a nominal 110 volt circuit may be used either upon a power circuit which frequently supplies current at the point of delivery at 90 volts or upon another circuit which may supply current at the point of delivery at 120 or 125 volts. It has, in the past, also been necessary to provide for the manufacture of several different variations of starting controls to accommodate different current frequencies because the power supply in this country employs in different communities. 25, 50 and 60 cycle current. It is therefore desirable that one starting control be provided which will operate satisfactorily upon a wide variation of voltages and frequencies.

Another difficulty with such bimetal starting and overload controls is that the operation varies according to changes in the room or environment temperature. Still another difficulty is that the overload protector may reset before the starting control resets.

It is an object of my invention to provide a practical bimetal starting control for controlling the energization of the phase winding in which the bimetal will not be overheated under any operating condition.

It is another object of my invention to provide a heating arrangement for a bimetal starting control which will supply sufficient heat to provide proper operation under all expected conditions without supplying excess heating under any conditions.

It is another object of my invention to provide a simple inexpensive starting control in which the timing is kept within a desirable range regardless of the variations in voltage conditions.

It is another object of my invention to provide a starting control which will operate satisfactorily upon current of 25, 50 and 60 cycles.

It is another object of my invention to provide a starting control in which the timing is kept within a desirable range regardless of changes in the room or environment temperature.

It is another object of my invention to provide means for keeping the motor overload protector tripping point within a desirable range regardless of the change in the room or environment temperature.

It is another object of my invention to provide a bimetal starting and overload control in which the overload will reset at the same time or earlier than the starting control.

It is another object of my invention to provide an improved support and arrangement of the ends of a bimetal strip.

It is another object of my invention to provide means for reducing the voltage drop and heating produced within an electro-thermal starting control during the starting period of the motor.

It is another object of my invention to provide a thermal snap-acting starting control which will trip quickly upon the application of a small amount of heat.

When the electric motor is connected to certain loads, such as for example, the compressor of a refrigerating system, the starting load upon the motor increases with the environment temperature and it is desirable that the length of the motor starting period be increased with increasing temperature to compensate for the slower acceleration of the motor to the optimum phase switching speed.

Generally speaking these objects are attained by providing a temperature compensated bimetal starting control having two cantilever bimetal strip portions with a snap-acting toggle compression spring between the free ends thereof. The functions of opening and closing the starting winding switch are separated. One of the strips carries a starting contact and is connected in series with the starting winding, so that it is self-heated and moves to open position to de-energize the starting winding and to discontinue the self-heating. After opening it is held in the open position by the toggle spring. It is reclosed prior to the energization of the starting winding by a third bimetal means controlled by the main winding current. The overload protector is self-reclosing, but otherwise is similar in connection to the starting control.

Further objects and advantages of the present invention will be apparent from the following description, reference being had to the accompanying drawings, wherein a preferred form of the present invention is clearly shown.

In the drawings:

Fig. 1 is a plan view of one form of starting control shown in the positions assumed during the starting period;

Fig. 2 is a sectional view taken along the lines 2—2 of Fig. 1;

Fig. 3 is a sectional view taken along the lines 3—3 of Fig. 1;

Fig. 4 is a sectional view taken along the lines 4—4 of Fig. 1;

The first form

Figure 5:
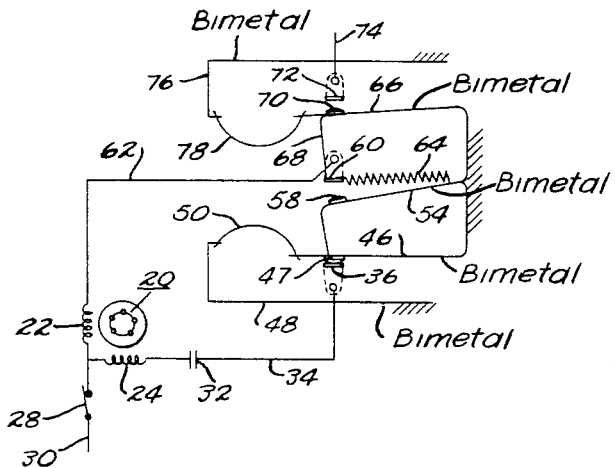
Fig. 5 is a diagrammatic view and wiring diagram with the parts shown in the position they assume when the overload protector is in the open position.

Referring now to the drawings and more particularly to Fig. 1, there is shown an electric motor circuit including an electric motor 20 having a main or running winding 22 and a phase or starting winding 24. The common junction of the main and phase windings 22 and 24 is connected by the conductor 26 to the main supply control switch 28 which is connected to one side 30, of the power source. A capacitor 32 may be connected in series with the phase winding 24 if desired, but my starting control will operate equally well without this capacitor and it may be omitted if an ample starting torque can be obtained without its use.

The phase winding control

The phase winding 24 and the capacitor 32 are connected by the conductor 34 to the L-shaped stationary starting winding contact 36, the horizontal portion of which is beneath the base 38 and is riveted thereto. It carries a binding screw 40 for connection with the conductor 34. The vertical portion extends upwardly through a slot in the base 38 and forms the contact portion proper. The base 38 is made of a suitable electrical insulating material and carries a U-shaped rib 42 also of electrical insulating material which supports the moving parts of the control.

Fastened to this rib 42 by the screw 44 is a cantilever bimetal strip 46 having its high expansion side facing outwardly and lays against the rib 42 and carrying a movable starting winding contact 47. The outer face of the rib 42 carries a hook-shaped temperature compensating bimetal strip 48 also having its high expansion side facing outwardly with its low expansion side laying against the rib 42. The adjacent ends of the starting bimetal strip 46 and the compensating bimetal strip 48 are notched and receive a light C-shaped toggle leaf spring 50. This forms a double toggle snap-acting arrangement since both the bimetal strips 46 and 48 are flexible. The geometrical arrangement and adjustment is such that when the starting bimetal 46 and its contact is in the closed position, the toggle spring 50 is at such an angle to impart a closing force thereto. This closing force may be reduced or increased by the adjusting screw 52 which tends to raise or lower the free end of the strip 46.

The effect of ambient temperature upon the starting bimetal strip 46 is compensated for by the effect of the ambient temperature upon the temperature compensating strip 48 since both strips have their high expansion sides facing outwardly and curl in the same direction upon ambient temperature changes. Thus as the ambient temperature rises, the starting bimetal strip 46 will have an increasing tendency to move away from the stationary contact 36 tending to reduce the contact pressure between the contacts 36 and 47. But as the ambient temperature rises, the compensating bimetal 48 will curl in the same general direction towards the stationary contact 36 to increase the angle of the toggle spring 50 to add to the contact pressure an amount sufficient to substantially compensate for the tendency of the starting bimetal to reduce the contact pressure upon the rise in ambient temperture. Where the load connected to the motor 20 increases with the increase in ambient temperature the bimetal strip 48 may be selected to slightly over-compensate for the effect of ambient temperature to increase the starting time as ambient temperature increases. If the load should decrease with the ambient temperature then the compensating bimetal strip 48 may be selected to slightly under-compensate for the effect of ambient temperature. The starting bimetal strip 46 is self-heated solely by the starting winding current flowing through it and it is made of such a cross-section that it will open at the proper time to deenergize the starting winding when the motor reaches the balancing speed regardless of ambient temperature conditions.

This time may be adjusted by adjusting the set screw 52 which changes the angle of the anchorage of the strip 46.

The reclosing control

Also fastened to the anchorage end of the starting bimetal strip 46 and the yoke of the rib 42 is a third bimetal member 54 having an inverted U-shape as shown in Fig. 3, so that current in flowing through this U-shaped bimetal member will normally be forced to flow from its anchorage, made by the screw 44, up one leg to the yoke end and down the other leg to the second anchorage provided by the screw 56 which extends into the yoke of the rib 42. The yoke end of the bimetal strip 54 is provided with a movable contact 58 adapted to cooperate with a stationary contact 60. This stationary contact 60 also serves as a connecting terminal for the conductor 62 which connects to the other end of the main winding 22.

Figure 6:
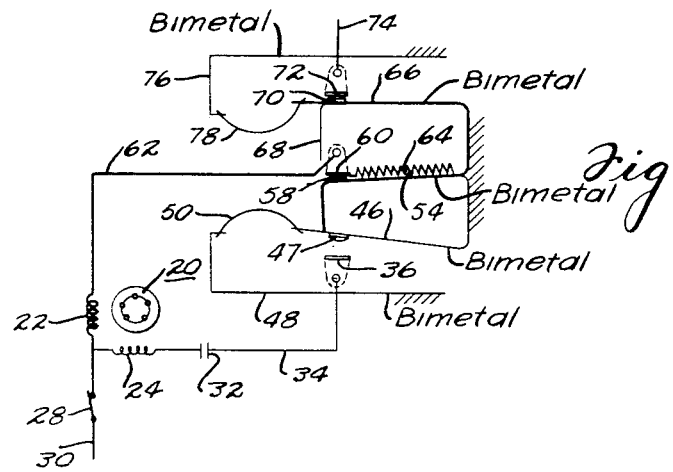
Fig. 6 is a similar view with the parts shown in one of the positions assumed during the running period, the energized electrical circuits being shown in heavy lines.
Figure 7:
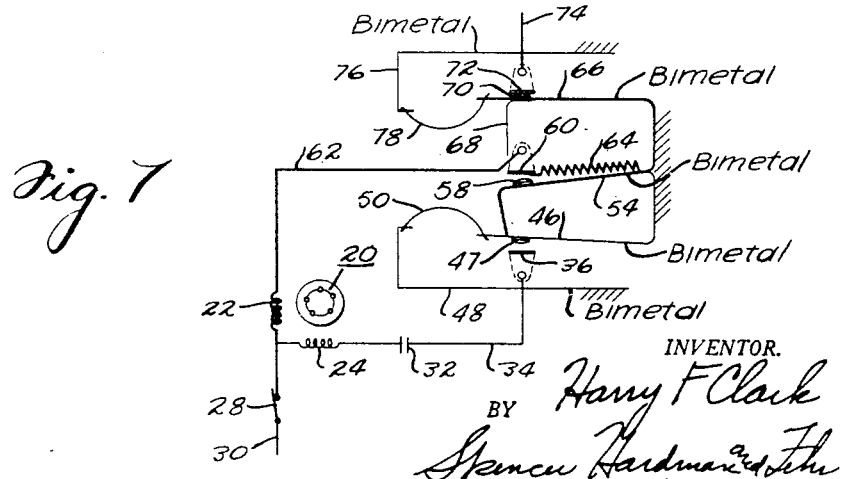
Fig. 7 is a view similar to Fig. 6 with the parts shown in the second position assumed during the running period.

An electric heater 64 is connected to the one leg adjacent the screw 44 and the other end is connected to the stationary contact 60. The yoke end of the bimetal strip 54 is bent toward the free end of the starting bimetal strip 46. It serves as a stop limit to the opening movement of the starting bimetal strip 46. It is sufficiently short that the starting bimetal strip 46 is held in the open position by the geometry of the toggle arrangement without any self-heating thereof. The bimetal strip 54 is arranged with its high expansion side facing the bimetal strip 46 so that when cool, it will bow toward the starting bimetal strip 46 as shown in Fig. 5 and move it to closed position. When heated by the main winding current flowing through it and the heater 64 in series, it will rapidly move away from the starting bimetal strip 46 to the position shown in Figs. 1 and 6 before the starting bimetal strip 46 is heated sufficiently to move to open circuit position. After the contact 58 makes contact with the stationary contact 60, the heater 64 and the leg of the bimetal 54 which is connected to the screw 44 are shunted by the other leg which is connected to the screw 56. This other leg is held in contact with the anchored end of the overload protector bimetal strip 66 by the screw 56.

The overload protector

This overload bimetal strip 66 is similar to the starting bimetal strip 46, but it is considerably wider and carries an arm 68 which engages the contact 60 to serve as a stop to limit the opening movement of the overload bimetal strip 66. The overload bimetal strip 66 carries a movable contact 70 which makes contact with the L-shaped stationary contact and terminal member 72 connecting with the other supply conductor 74. A compensating bimetal strip 76 having its high expansion side turned outwardly like the overload bimetal strip 66, is fastened to the adjacent outer face of the rib 42. It is similar to the compensating strip 48 and the ends of the overload bimetal strip 66 and the compensating strip 76 are notched to receive the C-shaped toggle leaf spring 78 which is somewhat wider than the toggle spring 50 and has a greater force. The overload bimetal strip 66 is self-heated by the current flowing through the supply conductor 74 and upon an overload is heated sufficiently to trip to the open position as shown in Fig. 5, and be held thereto a sufficient length of time to allow the motor to cool to a safe temperature before attempting a restart. The tripping point of the overload bimetal strip 66 may be adjusted by the adjusting screw 80.

Operation of first form

As soon as the main switch 28 opens to deenergize all the circuits, the bimetal element 54 will cool and bow toward the starting bimetal 46 and move it to closed position as shown in Fig. 5. The overload bimetal 66 will remain in the closed position. Upon reclosing of the main switch 28 current will flow simultaneously through both the starting and main winding circuits. The current flowing through the starting winding 24 and the conductor 34 will flow through the contact 36 to the starting bimetal 46 and thence through the U-shaped bimetal 54 from one end to the other. The current flowing through the main winding 22 and the conductor 62 will flow through the stationary contact and terminal 60 and the heater 64 to the bimetal strip 54 where it joins with the starting winding current and flows through the overload bimetal strip 66 and through the contacts 70 and 72 to the supply conductor 74.

The bimetal 54 will be rapidly heated by this flow of current and will quickly move to the position shown in Fig. 1. The bimetal 46 will be heated at a somewhat slower rate and at the proper time will open and move to the position shown in Fig. 6. This will deenergize the starting winding circuit and discontinue the self-heating of the bimetal strip 46. The bimetal strip 46 will remain in the open position due to the effect of the toggle spring 50.

As soon as the contact 58 makes contact with the stationary contact 60 the heater 64 and one leg of the bimetal strip 54 are placed in shunt with the other leg. This reduces the heating rate of the bimetal strip 54 and prevents it from overheating. It may open a slight amount from time to time to increase the heating rate to keep it in this position during the running period of the motor 20, during which the motor current flow is greatly reduced. The increased rate of heating with the contacts open will return the strip 54 to its position against the stationary contact 60. Through this arrangement the heating of the element 54 is kept at a low enough rate to prevent its overheating.

The second form

Figure 8:
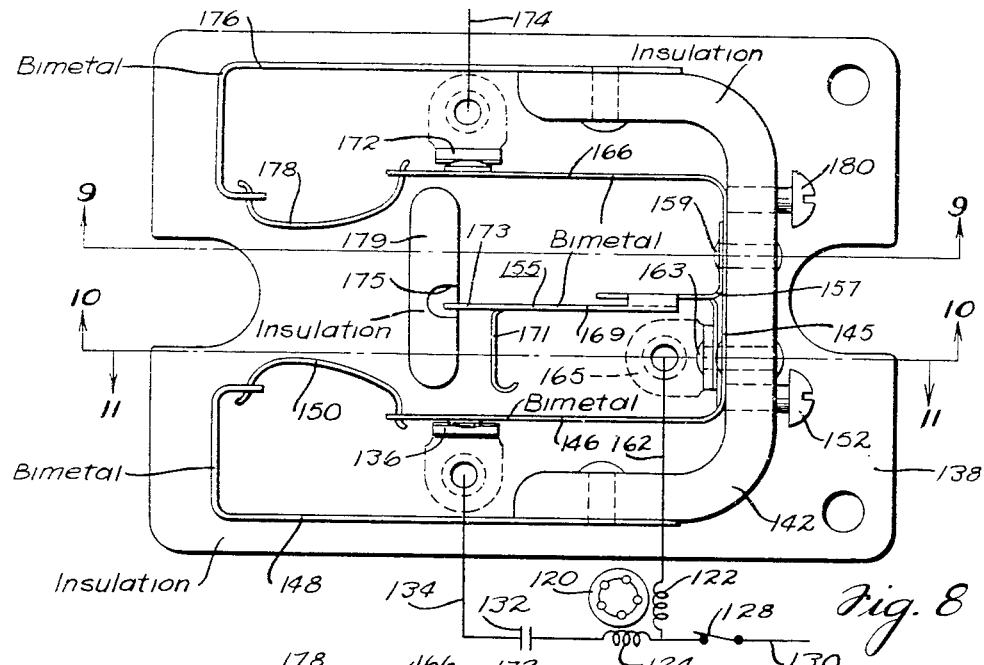
Fig. 8 is a plan view of another form of my control with the parts shown in the positions assumed toward the end of the starting period.

In Figs. 8 to 16 a slightly different form is shown. In Fig. 8 there is shown a supply conductor 130 connected to a main switch 128 which in turn is connected to the junction of the main or running winding 122 and the phase or starting winding 124 of the electric motor 120. A starting capacitor 132 may be connected in series with the phase winding 124 to provide increased starting torque if desired.

The phase winding control

Figure 9:
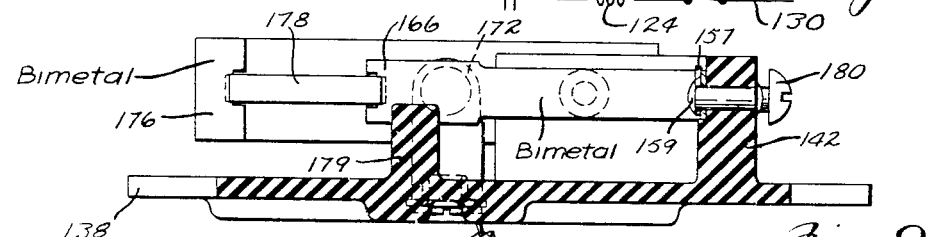
Fig. 9 is a sectional view taken along the lines 9—9 of Fig. 8.
Figure 10:
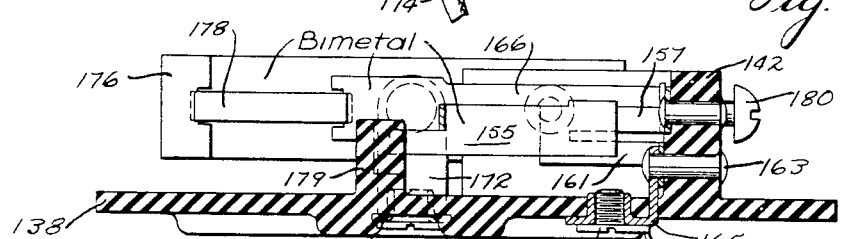
Fig. 10 is a sectional view taken along the lines 10—10 of Fig. 8.
Figure 11:
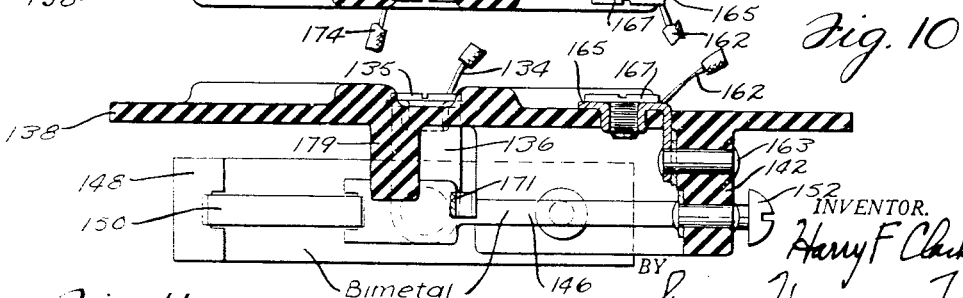
Fig. 11 is a sectional view taken along the lines 11—11 of Fig. 8.

The phase winding 124 is connected by the conductor 134 to the starting terminal and starting contact 136 by the terminal screw 135. A U-shaped bimetal strip is fastened to the yoke of the U-shaped rib 142. This U-shaped bimetal strip includes a leg 146 forming the starting bimetal strip and a second leg 166 forming the overload bimetal strip. The leg 146 is made narrower, as shown in Fig. 11, than the leg 166 as shown in Fig. 9.

The reclosing control

Positioned within the U-shaped bimetal member is another bimetal member 155 which has the same function as the bimetal member 54 of Figs. 1 to 7, namely, of returning the starting bimetal leg to the closed circuit position prior to the energization of the phase winding circuit; but this is accomplished in a somewhat different way at a somewhat different time. This member 155 has a U-shaped portion including one leg 157 fastened by the rivet 159 to the yoke 145 of the U-shaped bimetal member which includes the legs 146 and 166. The leg 157 is connected through a yoke to a second leg 161 which is riveted by the rivet 163 to the L-shaped terminal member 165 to which the conductor 162 extending from the main winding 122 is connected by the terminal screw 167. Extending from the exposed edge of the leg 157 and folded downwardly therefrom is an integral arm 169 having one end portion 171 bent at right angles and curled at its extreme end. The straight extending portion 173 extends into a notch 175 provided in the stop projection 179 molded integral with the base 138 as is the rib 142. By reason of the fact that the member 155 is folded between the leg 157 and the arm 169, this leg and arm tend to bow in opposite directions and they are therefore compensated for the effect of ambient temperature thereon.

Adjustment of the starting bimetal

Figure 14:
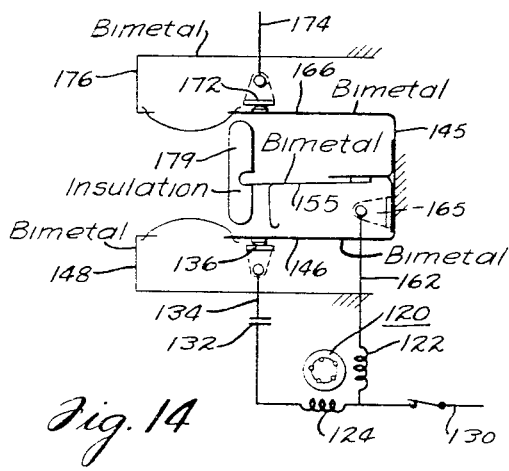
Fig. 14 is a view similar to Figs. 12 and 13 with parts shown in the position they assume at the beginning of the starting period.

The outer face of one leg of the rib 142 carries the compensating bimetal 148. The C-shaped toggle snap-acting spring 150 extends between the notched end of this hook-shaped compensating bimetal 148 and the notched end of the starting bimetal 146. The geometry and spring effect of the bimetal strips and the toggle spring 150 is such that when cool the bimetal leg 146 will be held with its contact either in contact with the starting contact 136 as shown in Figs. 1 and 14, or in a position against the stop projection 179 as shown in Figs. 12, 13, 15 and 16. An adjusting screw 152 threads through the rib 142 and bears upon the end of the yoke 145 adjacent the bimetal leg 146 to adjust the angle of its anchorage.

The overload protector

Similarly the adjusting screw 180 threads through the rib 142 and bears upon the end of the yoke 145 immediately adjacent the overload bimetal leg 166 to adjust the angle of its anchorage. The overload bimetal leg 166 carries the movable contact which is normally in engagement with the stationary contact and terminal 172 to which the supply conductor 174 is connected. A hook-shaped compensating bimetal strip 176 for compensating for the effect of ambient temperature upon the overload bimetal leg 166 is fastened to the outer face of the rib 142. A C-shaped toggle leaf spring 178 extends between the notched ends of the compensating bimetal 176 and the overload bimetal leg 166 to provide a snap-action, and for holding overload contacts normally in the closed position with sufficient contact force.

Operation

Figure 12:
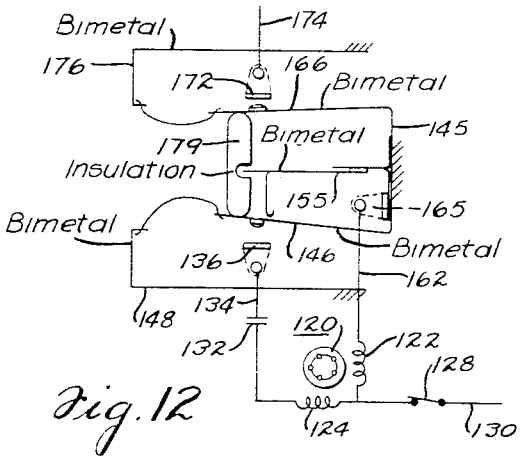
Fig. 12 is a diagrammatic view and wiring diagram showing the parts in the positions assumed after the tripping of the overload protector.
Figure 13:
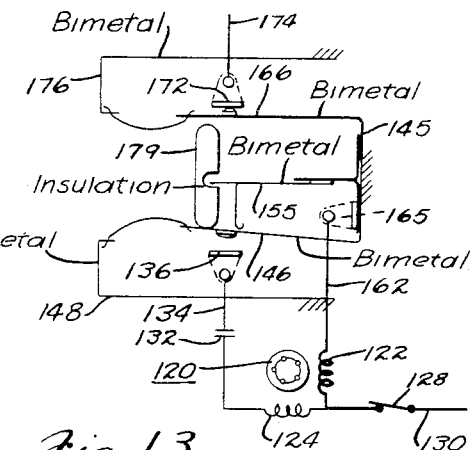
Fig. 13 is a view similar to Fig. 12 with the parts shown in the position they assume immediately after the closing of the overload protector and the main switch, the parts through which the current is passing being shown in heavy lines with the remainder in light lines.

Upon excessive current flow through the motor circuit, the overload bimetal leg 166 is self-heated sufficiently to overcome the force of the C-shaped toggle spring 78 to move to the open circuit position illustrated in Fig. 12. The starting bimetal leg 166 remains in the open position and the middle bimetal member 155 cools and assumes the position shown in Fig. 12. It is necessary for both the main switch 128 and the overload switch contacts 172 to close or be closed before the motor 120 will start. As soon as these switches are closed, current will flow from the supply conductor 130 through the main switch to the junction and through the main winding 122 and the conductor 162 to the terminal 165, from which point the current will flow through the leg 161 and the leg 157 to the yoke 145 of the U-shaped bimetal. From this point the current will travel through the overload leg 166 and the overload contacts 172 to the supply conductor 174. The rapid self-heating of the legs 161 and 157 of the middle bimetal member, by the initial heavy current flow, will cause it to bow rapidly toward the starting bimetal leg 146 and continue to move until its projection 171 engages and pushes the starting bimetal leg 146 through its tripping point from which point this starting bimetal leg 146 will continue to closed position under the force provided by the C-shaped toggle spring 150 without further aid. The middle bimetal member 155 will be stopped by its end portion reaching the end of the notch 175 as shown in Fig. 14. In this position, the projection 171 is within the snap-acting or tripping zone wherein the starting bimetal leg 146 will continue to move to closed position.

Figure 15:
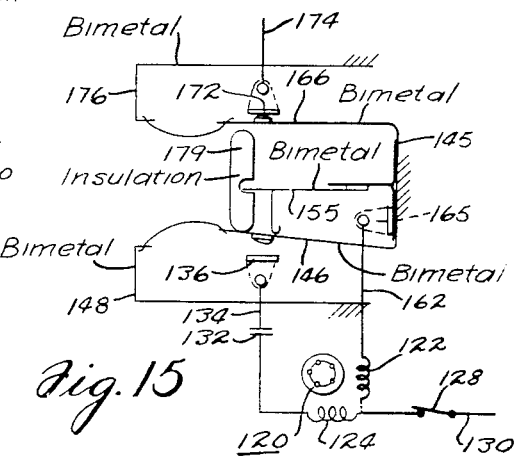
Fig. 15 is a view similar to Figs. 12 to 14 with the parts shown in the position they assume during a normal running period.

As soon as the starting bimetal leg 146 moves to closed position, current will flow from the junction through the starting winding and the conductor 134 to the starting terminal contact 136 and through the starting bimetal leg 146, the yoke portion 145 and the overload leg 166 along with the main winding current to the supply conductor 174. This self-heating of the starting bimetal leg 146 will cause it to move to the open position with a double toggle snap action as shown in Fig. 15. During the starting period, current flowing through the bimetal legs 161 and 157 is reduced sufficiently to cause the middle bimetal member 155 to move to the position shown in Fig. 15. This allows the starting bimetal leg 146 to move against the projection 179 and remain there throughout the remainder of the running period of the motor. This stops the self-heating of the starting bimetal and the current now flows only through the legs 161 and 157 of the middle bimetal member and the overload bimetal leg 166.

Figure 16:
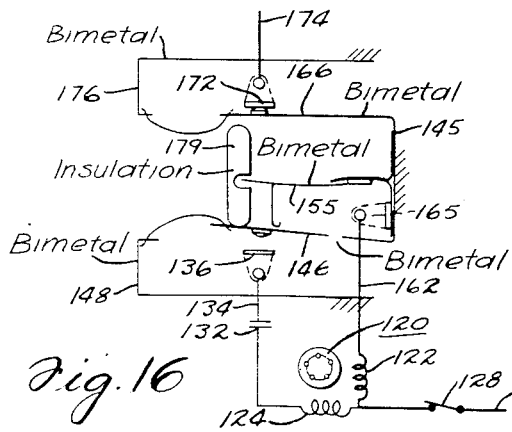
Fig. 16 is a view similar to Fig. 15 with the parts shown in the position they assume during a running period where the load is exceptionally heavy but not sufficient to trip the overload protector.

During normal running conditions the current flow is greatly reduced and the heating effect is slight. Should the motor current be high for long periods of time and yet not sufficiently high to open the overload contacts, the legs 161 and 157 will become warm and tend to bow the member 155 as shown in Fig. 16. By reason of the fact that the portion 169 is folded relative to the legs 161 and 157 it will bow in the opposite direction as shown in Fig. 16, so that any long continued abnormal heating or high ambient temperature of the legs 161 and 157 will not cause the projection 171 to move the starting bimetal leg 146 to closed position, but the portion 169 will take a reverse curve as shown in Fig. 16 to curl away from the end of the slot 175 away from the starting bimetal leg 146.

Through this arrangement no external heaters are required and self-heating of the bimetals is kept at a relatively low level because rapid heating is only required of the legs 161 and 157 prior to closing of the starting contacts 136. An initial heavy current is inherent as soon as the motor circuits are energized, since the motor is at a stand-still and remains so until the starting winding contacts are closed. This initial heavy current very rapidly closes the starting contacts and thereafter the self-heating of the legs 161 and 157 is rapidly reduced. This control is easy to manufacture and adjust, it is quiet in operation, requires no difficult welding operations and is fully compensated for ambient temperature.

While the form of embodiment of the invention as herein disclosed, constitutes a preferred form, it is to be understood that other forms might be adopted, as may come within the scope of the claims which follow.

What is claimed is as follows:

1. A control for an electric motor having main and phase windings comprising a first bimetal strip means and a snap-acting switch contact means connected to and operated to open position by said first strip means upon heating thereof to control the energization of the phase winding, means for heating said first strip means coincidentally with the energization of the phase winding, a second bimetal strip means movable away from said first strip means upon heating and movable toward said strip means upon cooling, said second strip means being provided with means for reclosing said switch contact means, and means for heating said second strip means coincidentally with the energization of the main winding.

2. A control for an electric motor having main and phase windings including a first bimetal strip means and a snap-acting switch contact means connected to and operated to open position by said first strip means upon heating thereof to control the energization of the phase winding, a second bimetal strip means provided with means effective upon cooling for closing said switch contact means, means for heating said first strip means coincidentally with the energization of the phase winding, and means for heating the second strip means coincidentally with the energization of the main winding.

3. A control for an electric motor having main and phase windings including a first bimetal strip means and a snap-acting switch contact means connected to and operated to open position by said first strip means upon heating thereof to control the energization of the phase winding, a second bimetal strip means provided with means effective upon cooling for closing said switch contact means, means for heating said first strip means coincidentally with the energization of the phase winding, and means for heating the second strip means coincidentally with the energization of the main winding, and means for reducing the heating of said second strip means whenever it is heated sufficiently.

4. A control for an electric motor having main and phase windings including a first bimetal strip means adapted to be connected in series circuit relationship with the phase winding, switch contact means carried by said strip means and movable to open position upon heating for controlling the energization of the phase winding, snap-acting means acting upon the strip means for controlling the movement of the switch contact means to open position and for holding the switch contact means in the open position, a second bimetal means provided with means effective upon cooling for closing said switch contact means, and means for heating said second bimetal means coincidentally with the energization of said motor.

5. A control for an electric motor having main and phase windings including a first bimetal strip means adapted to be connected in series circuit relationship with the phase winding, switch contact means carried by said strip means and movable to open position upon heating for controlling the energization of the phase winding, snap-acting means acting upon the strip means for controlling the movement of the switch contact means to open position and for holding the switch contact means in the open position, a second bimetal means provided with means effective upon cooling for closing said switch contact means, and means for heating said second bimetal means coincidentally with the energization of said motor, said second bimetal means having contact means and a shunting arrangement for limiting its heating.

6. A control for an electric motor having main and phase windings comprising a cantilever bimetal strip means having a contact means at its free end portion, a cantilever compensating bimetal strip means, a snap-acting spring means connected between the free end portions of said strip means, a second contact means cooperating with said first mentioned contact means, said contact means being connected in series circuit relation with at least one of said windings, and means for heating said first strip means coincidentally with the energization of one of the windings.

7. A control for an electric motor having main and phase windings including a first bimetal strip means, means for heating said strip means coincidentally with the energization of the phase winding, snap-acting switch means connected to and operated to open position by said first strip means upon heating thereof for controlling the energization of the phase winding, a second bimetal strip means having means for moving said switch means to closed position, and means for heating said second strip means coincidentally with the energization of said main winding.

8. A control for an electric motor having main and phase windings including a first bimetal strip means, means for heating said strip means coincidentally with the energization of the phase winding, snap-acting switch means connected to and operated to open position by said first strip means upon heating thereof for controlling the energization of the phase winding, a second bimetal strip means having means effective upon heating of the second strip means for moving said switch means to closed position, and means for heating said second strip means coincidentally with the energization of said main winding.

9. A control for an electric motor having main and phase windings including a first bimetal strip means and snap-acting switch means connected to and operated to open position by said strip means upon the heating thereof for controlling the energization of the phase winding, means for heating said strip means coincidentally with the energization of the phase winding, a second bimetal strip means having means effective upon heating to a predetermined temperature for moving said switch means to closed position and movable to an ineffective position upon a reduction in heating, means for heating said second strip means to said predetermined temperature coincidentally with the initial energization of the main winding.

10. A control for an electric motor having main and phase windings including a first bimetal strip means and snap-acting switch means connected to and operated to open position by said strip means upon the heating thereof for controlling the energization of the phase winding, means for heating said strip means coincidentally with the energization of the phase winding, a second bimetal strip means having means effective upon heating to a predetermined temperature for moving said switch means to closed position and movable to an ineffective position upon a reduction in heating, means for heating said second strip means to said predetermined temperature coincidentally with the initial energization of the main winding and to a much lower temperature thereafter.

11. A control for an electric motor having main and phase windings including first bimetal strip means, second bimetal strip means, toggle spring means between each end portion of the first strip means and said second strip means, said second strip means having temperature deflection characteristics arranged to deflect the toggle spring means in the direction to have an ambient temperature compensating action upon the first strip means, separate switch means individually controlled by different end portions of the first strip means, means connecting one end portion of the first strip means and one of said switch means in series circuit relation with the phase winding, means connecting another end portion of the first strip means and another of said switch means in series circuit relation with one of the supply conductors, each end portion of said first strip means and its switch means being movable to the open circuit position upon heating to a predetermined temperature difference above the temperature of the second strip means.

12. A control for an electric motor having main and phase windings including first bimetal strip means, second bimetal strip means, toggle spring means between each end portion of the first strip means and said second strip means, said second strip means having temperature deflection characteristics arranged to deflect the toggle spring means in the direction to have an ambient temperature compensating action upon the first strip means separate switch means individually controlled by different end portions of the first strip means, means connecting one end portion of the first strip means and one of said switch means in series circuit relation with the phase winding, means connecting another end portion of the first strip means and another of said switch means in series circuit relation with one of the supply conductors, each end portion of said first strip means and its switch means being movable to the open circuit position upon heating to a predetermined temperature difference above the temperature of the second strip means, and a third bimetal means heated coincidentally with the energization of the main winding for moving the switch means and the strip means connected in series with the phase winding to closed position prior to the energization of the phase winding.

13. A control for an electric motor having main and phase windings including first bimetal strip means, second bimetal strip means, toggle spring means between each end portion of the first strip means and said second strip means, said second strip means having temperature deflection characteristics arranged to deflect the toggle spring means in the direction to have an ambient temperature compensating action upon the first strip means, separate switch means individually controlled by different end portions of the first strip means, means connecting one end portion of the first strip means and one of said switch means in series circuit relation with the phase winding, means connecting another end portion of the first strip means and another of said switch means in series circuit relation with one of the supply conductors, each end portion of said first strip means and its switch means being movable to the open circuit position upon heating to a predetermined temperature difference above the temperature of the second strip means, and a third bimetal means heated coincidentally with the energization of the main winding for moving the switch means and the strip means connected in series with the phase winding to closed position prior to the energization of the phase winding, said third bimetal means being electrically connected to an intermediate portion of the first strip means and to one end of the main winding.

14. A control for an electric motor having main and phase windings including a first bimetal strip means carrying a switch contact, a stationary switch contact cooperating with the other contact, means for connecting said contact and said strip means in series circuit with the phase winding, snap-acting means cooperating with said strip means providing a zone in which the strip means will snap closed when at room temperature, a stop means for limiting the opening movement of said strip means at a point beyond said zone, a second bimetal means heated coincidentally with the energization of the main winding and having means for moving said first strip means from outside said zone into said zone, and means for stopping said moving means at a point at which the first strip means is pushed into said zone but a substantial distance short of the point at which the first strip means and its contact are in fully closed position.

15. A control for an electric motor having main and phase windings including a first bimetal strip means, means for heating said strip means coincidentally with the energization of the phase winding, snap-acting switch means connected to and operated to open position by said first strip means upon heating thereof for controlling the energization of the phase winding, a second bimetal strip means having means for moving said switch means to closed position, means for heating said second strip means coincidentally with the energization of said main winding, and bimetal temperature compensating means for compensating for the effect of environment temperatures upon said first strip means.

16. A control for an electric motor having main and phase windings including a first bimetal strip means carrying a switch contact, a stationary switch contact cooperating with the other contact, means for connecting said contact and said strip means in series circuit with the phase winding, a snap-acting means including a second bimetal strip means and a toggle spring extending between the end portions of said first and second strip means, said second strip means being arranged to deflect the toggle means so as to substantially compensate for the effect of ambient temperature upon the first strip means.

17. A control for an electric motor having main and phase windings including a bimetal strip means, means for heating said strip means coincidentally with the energization of the phase winding, snap-acting switch means connected to and operated to open position by said strip means upon heating thereof for controlling the energization of the phase winding, and means controlled in accordance with the energization of said main winding for moving said switch means to closed position.

18. In combination with a load requiring increased starting effort with increasing ambient temperature, an electric motor having main and phase windings for starting the load, thermal current heated starting switch means for disconnecting the phase winding at the end of the starting period, said starting switch means including an ambient temperature regulated thermal overcompensating means for increasing the starting period as the ambient temperature increases.

19. A control for an electric motor having main and phase windings including an electrically impelled switch means for controlling the energization of the phase winding, said switch means having an electrical impelling means energized coincidentally with the energization of the phase winding for moving the switch means in one direction from a first control position to the second control position, mechanical means for yieldingly holding the switch means in said second position, and electrically operated means controlled in accordance with the energization of the main winding for moving the switch means in a second direction from the second position to the first.

HARRY F. CLARK.

REFERENCES CITED

The following references are of record in the file of this patent:

UNITED STATES PATENTS

| Number | Name | Date |
|---|---|---|
| 2,175,032 | Schaefer | Oct. 3, 1939 |
| 2,379,602 | Stickel | July 3, 1945 |